(12) United States Patent
Ding et al.

(10) Patent No.: US 12,405,135 B2
(45) Date of Patent: Sep. 2, 2025

(54) TELECOM CABLE TENSION SCREENING TECHNIQUE BASED ON WAVE PROPAGATION AND DISTRIBUTED ACOUSTIC SENSING

(71) Applicant: NEC Laboratories America, Inc., Princeton, NJ (US)

(72) Inventors: Yangmin Ding, East Brunswick, NJ (US); Yue Tian, Pennington, NJ (US); Sarper Ozharar, Pennington, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 306 days.

(21) Appl. No.: 18/319,466

(22) Filed: May 17, 2023

(65) Prior Publication Data

US 2023/0375375 A1    Nov. 23, 2023

Related U.S. Application Data

(60) Provisional application No. 63/343,623, filed on May 19, 2022.

(51) Int. Cl.
*G01L 1/24*    (2006.01)
*G01D 5/353*   (2006.01)
(Continued)

(52) U.S. Cl.
CPC ......... *G01D 5/35358* (2013.01); *G01H 9/004* (2013.01); *G01L 1/242* (2013.01);
(Continued)

(58) Field of Classification Search
CPC ................................ G01L 1/242; G01L 1/246
See application file for complete search history.

(56) References Cited

U.S. PATENT DOCUMENTS 5,228,893 A * 7/1993 Smithgall ........... C03B 37/0253
                                                        356/429
5,454,272 A * 10/1995 Miller ..................... G01L 5/042
                                                        73/862.391
(Continued)

FOREIGN PATENT DOCUMENTS

JP      2006250647 A * 9/2006

OTHER PUBLICATIONS

Okamoto, Tatsuya, Daisuke Iida, and Hiroyuki Oshida. "Identification of sagging aerial cable section by distributed vibration sensing based on OFDR." Optical Fiber Communication Conference. Optica Publishing Group, 2019.*

(Continued)

*Primary Examiner* — Herbert K Roberts
(74) *Attorney, Agent, or Firm* — Joseph Kolodka

(57) ABSTRACT

A radio-controlled, two-way acoustic modem for operating with a distributed fiber optic sensing (DFOS) system including circuitry that receives radio signals including configuration information, configures the modem to operate according to the configuration information, and generate acoustic signals that are detected by the DFOS system. The acoustic modem includes one or more sensors that detect environmental information that is encoded in the acoustic signals for further reception by the DFOS system. The received configuration information may change the operating times, sensors or other operating aspects of the modem as desired an such information may be transmitted from a fixed location or a mobile vehicle.

5 Claims, 7 Drawing Sheets

(51) Int. Cl.
　　　G01H 9/00　　　(2006.01)
　　　G06T 7/13　　　(2017.01)
　　　G06T 7/70　　　(2017.01)
(52) U.S. Cl.
　　　CPC ............... *G06T 7/13* (2017.01); *G06T 7/70* (2017.01); *G06T 2207/10024* (2013.01)

(56) References Cited

U.S. PATENT DOCUMENTS

2021/0172729 A1* 6/2021 Huang .................... G01L 1/242
2021/0318166 A1* 10/2021 Ding ...................... G01H 9/004

OTHER PUBLICATIONS

Yang, Nachuan, Yongjun Zhao, and Jinyang Chen. "Real-time Φ-OTDR vibration event recognition based on image target detection." Sensors 22.3 (2022): 1127.*

Xia, Tiejun J., et al. "First proof that geographic location on deployed fiber cable can be determined by using OTDR distance based on distributed fiber optical sensing technology." Optical Fiber Communication Conference. Optica Publishing Group, 2020.*

Lu, You, et al. "Automatic fine-grained localization of utility pole landmarks on distributed acoustic sensing traces based on bilinear resnets." ICASSP 2021—2021 IEEE International Conference on Acoustics, Speech and Signal Processing (ICASSP). IEEE, 2021.*

* cited by examiner

Hammer Strike
Vibration Data

Color waterfall image

Convert the image into greyscale

Find the edges by applying edge detection operatiors

Hammer Strike
Vibration Data

TELECOM CABLE TENSION SCREENING TECHNIQUE BASED ON WAVE PROPAGATION AND DISTRIBUTED ACOUSTIC SENSING

CROSS-REFERENCE TO RELATED APPLICATIONS

This application claims the benefit of U.S. Provisional Patent Application Ser. No. 63/343,623 filed May 19, 2022, the entire contents of which is incorporated by reference as if set forth at length herein.

FIELD OF THE INVENTION

This application relates generally to distributed fiber optic sensing (DFOS) systems, methods, and structures and related technologies. More particularly, it pertains to a telecommunications cable tension screening technique based on wave propagation and distributed acoustic sensing (DAS).

BACKGROUND OF THE INVENTION

A large portion of contemporary fiber optic telecommunications networks include aerial cables suspended on utility poles. The tensional forces experienced by the installed fiber optic cable changes over time. Variations in cable tension oftentimes leads to structural performance decay of fiber optic cable-supporting structures. As a result, telecommunications service providers must monitor the tension of aerial fiber optic cables to ensure reliable telecommunications services.

In a traditional method of tension monitoring, a tension meter is used to precisely determine an exact tension of the fiber optic cable. Operationally, tension meters are clamped onto a fiber optic cable or wire rope to measure a deflection and then convert the measured deflection into a tension measurement. This traditional method requires that tension meters be installed on multiple spans of fiber optic cable where a tension measurement is required. Such a process is expensive, time-consuming, and requires considerable technician time.

SUMMARY OF THE INVENTION

An advance in the art is made according to aspects of the present disclosure directed to a telecommunications cable tension screening technique based on wave propagation and distributed acoustic sensing (DAS).

In sharp contrast to the prior art and viewed from a first aspect, our inventive technique provides a quick tension screening of telecommunications fiber optic cable along a route using the telecommunications fiber optic cable itself as a sensing medium and provides real-time tension screening/determination along the entire fiber optic cable route.

Viewed from another aspect, our inventive technique may be summarized according to the following process: 1) a DFOS system with interrogator is integrated with a target telecommunications fiber optic cable route thereby making the entire fiber optic cable route a fiber optic sensor; 2) a field technician provides mechanical impacts on a utility pole suspending the fiber optic cable, the impacts having a time interval of t0; a machine learning process determines a wave speed associated with the impacts; and 4) a tension force is determined using a wave propagation theory.

Operationally, an existing fiber optic cable provides vibrational sensing along its entire length without requiring any external power or a communications channel for data transfer or control. Sensing of the entire fiber optic cable length is performed from one end of the fiber optic cable with extreme precision and sensitivity.

To determine cable tension along its length, we employ wave propagation techniques to obtain the tension force by first determining utility pole locations relative to the length of the fiber optic cable. Vibrational data resulting from mechanical impacts to the utility poles are converted into images providing pole localization using an edge detection algorithm. Advantageously, by employing our inventive edge detection method and wave propagation analysis to obtain tension force a quick, reliable, and precise measure of tension of the fiber optic cable is achieved.

DETAILED DESCRIPTION OF THE INVENTION

Figure 1A:
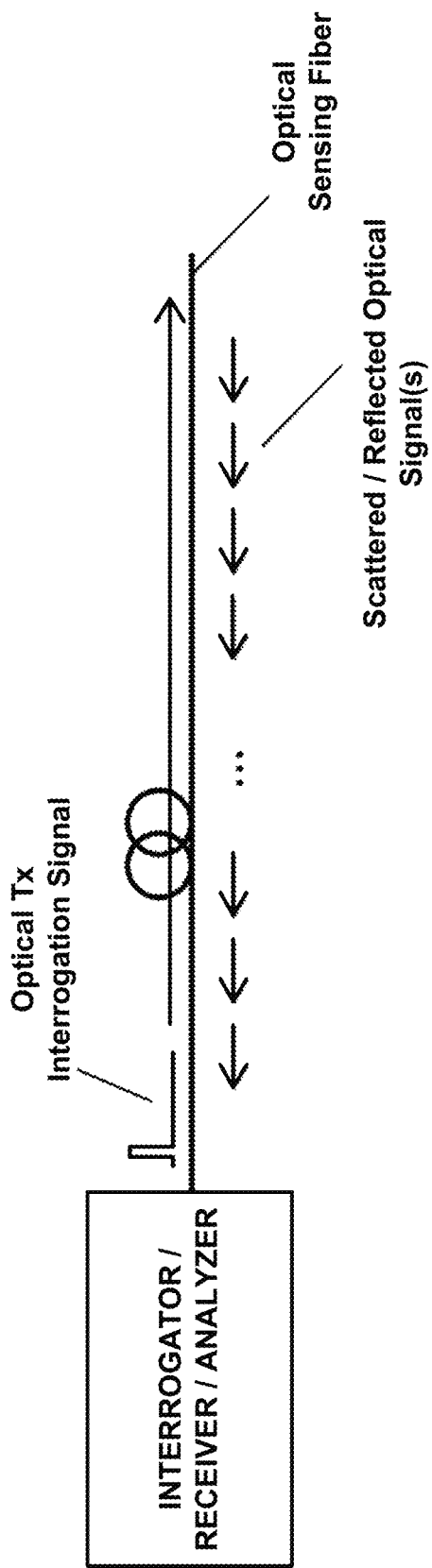
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor(s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect optoelectronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
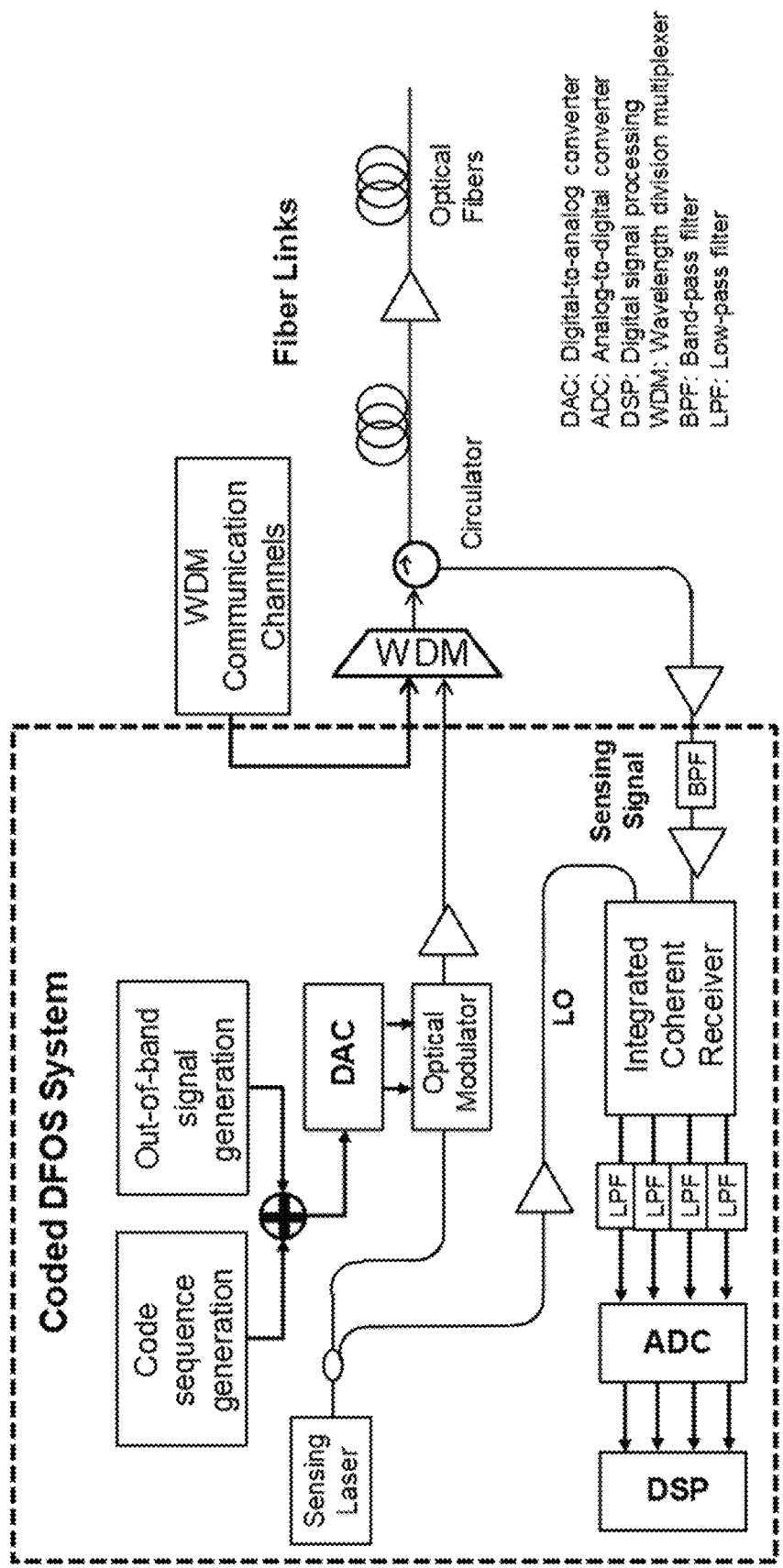

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. Classification methods may be further used to detect and locate events or other environmental conditions including acoustic and/or vibrational and/or thermal along the length of the optical sensing fiber.

As we have noted, the systems and methods according to the present disclosure employ distributed fiber optic sensing (DFOS)/distributed acoustic (DAS)/distributed vibrational sensing (DVS) to collect the vibration data from a fiber optic sensor cable supported at least in part by utility poles. Wave propagation techniques and edge detection methods are used to obtain the tension forces of the fiber optic cable. Advantageously, existing fiber optic telecommunications carrying live traffic can also serve as DFOS sensors along its entire length, without requiring additional electrical power or a communications channel(s)I. Monitoring vibrational activity along the entire length of the fiber optic sensor cable can be performed from a single end. As we shall show and describe in further detail, our inventive method employs wave propagation techniques to obtain the tension forces of the fiber optic sensor cable. In obtaining a wave speed, our method first determines utility pole locations along the length of the fiber optic sensor cable at which the cable is suspended. Vibrational data resulting from mechanical impacts applied to the poles are detected/received by the DFOS system, and converted into images for pole localization through edge detection techniques. Tension forces acting on the fiber optic sensor cable are then determined.

Figure 2:
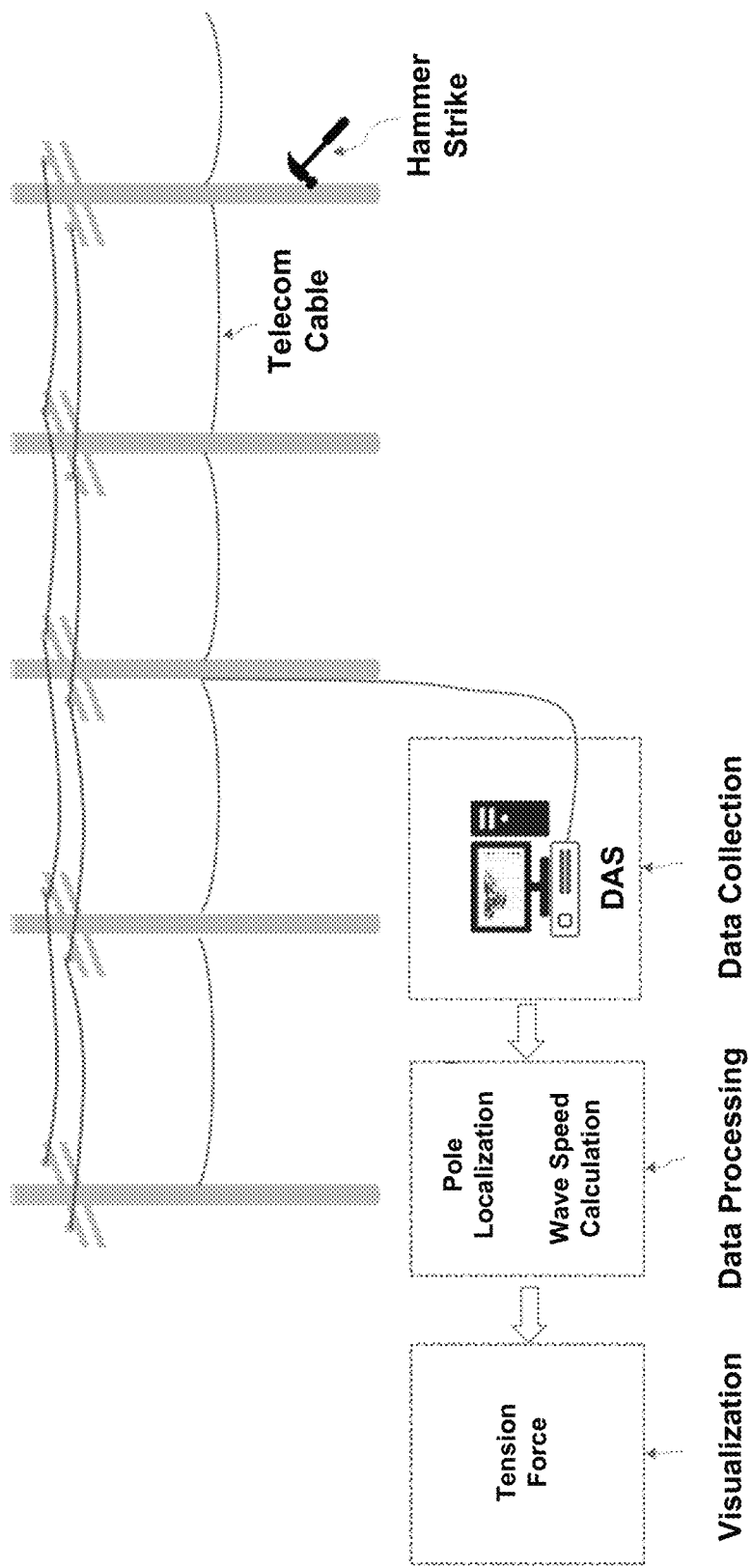
FIG. 2. Is a schematic diagram showing an illustrative system and method for screening telecommunications cable tension(s) according to aspects of the present disclosure.

FIG. 2. Is a schematic diagram showing an illustrative system and method for screening telecommunications cable tension(s) according to aspects of the present disclosure shows an overall framework according to the present disclosure.

As shown in the figure, a series of utility poles are shown suspending a telecommunications cable, which as we have noted becomes a fiber optic sensor with the addition of a DOFS/DAS system including interrogator and analyzer. As illustratively shown, the DAS provides data collection and subsequent analysis provides utility pole localization and wave speed determination. Such determinations are used by a visualization operation to determine tension forces along the length of the fiber optic sensor cable. When used collectively, our inventive system provides tension screening. As illustrated, our tension screening system includes data collection operations, data processing operations, and data reporting operations.

Consider a scenario wherein a technician mechanically impacts a utility pole suspending the fiber optic sensor cable 5 times at a time interval of $t_0$ ($t_0 \geq 5$ s). The mechanical impacts result in the utility pole vibrating.

The vibrating utility pole produces vibrations in the fiber optic sensor cable which in turn is detected by the DAS data collection operation. As is known, DAS vibration sensing can sense/collect mechanical vibrations in an optical fiber sensor cable up to a range of about 100 km with a resolution of about 50 cm. Advantageously, such mechanical detections may be provided by existing fiber optic telecommunications cables already deployed and even those carrying live telecommunications traffic.

The received raw vibration signal is preprocessed for localizing the pole and obtaining the wave speed. Such signals are generally depicted as a waterfall image, and such waterfall images are converted to greyscale.

Figure 3:
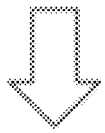
FIG. 3 is a schematic block diagram showing illustrative flow chart of a process according to aspects of the present disclosure.
Figure 3:
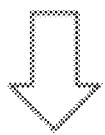
Figure 3:
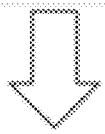
Figure 3:
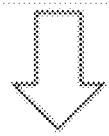

FIG. 3 is a schematic block diagram showing an illustrative flow chart of a process according to aspects of the present disclosure.

During visualization, a tension force at each fiber optic sensor cable section along the route is presented. The derivation of the tension force acting on the fiber optic sensor cable is as follows.

Consider a mass element $\Delta x$ from a cable with a length of l. The mass element is in static equilibrium, and the force of tension $F_T$ acting on either side of the mass element is equal in magnitude and opposite in direction.

Figure 4:
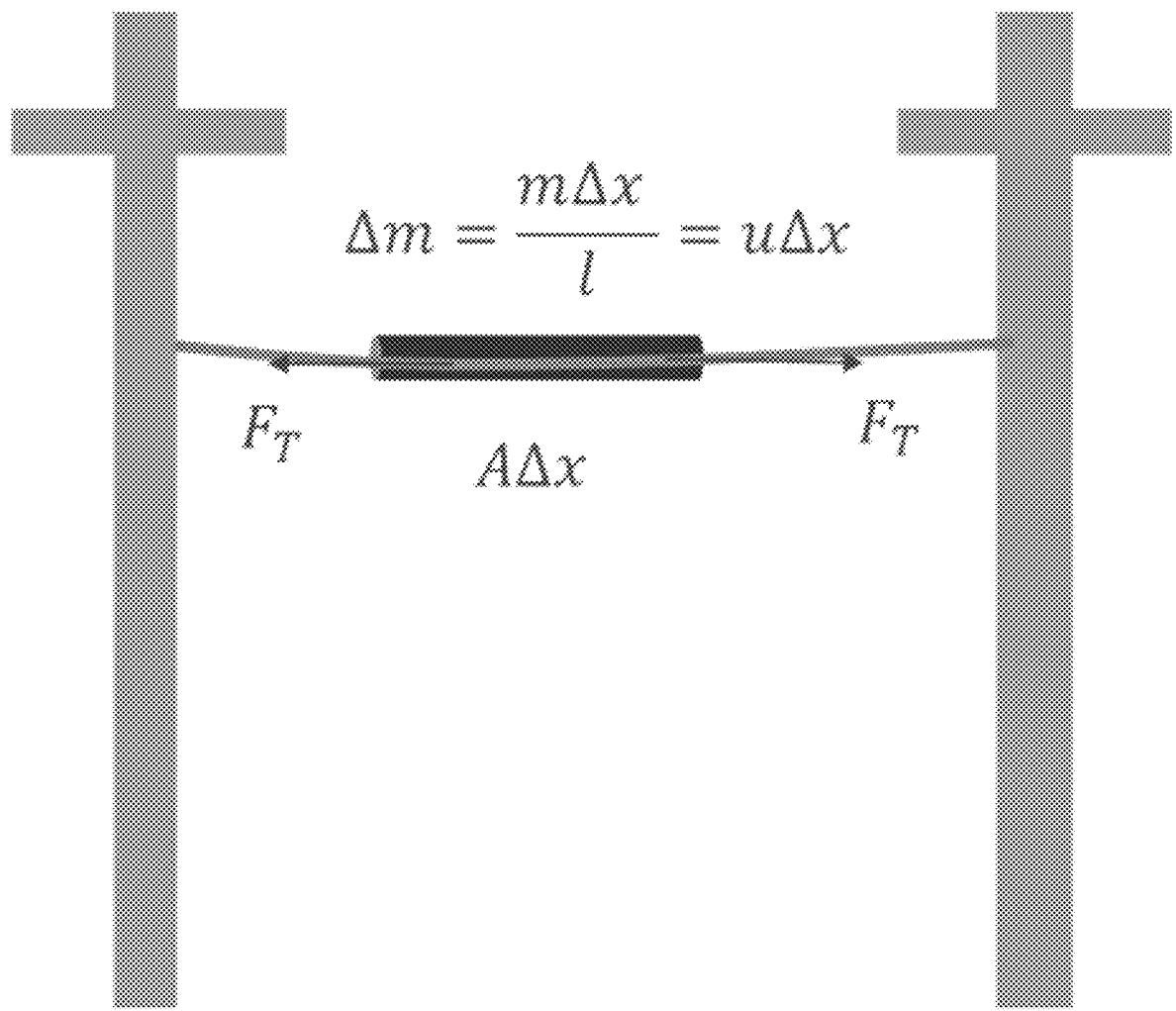
FIG. 4 is a schematic diagram showing static equilibrium of a cable mass under tension according to aspects of the present disclosure.

The tension $F_T$ in the string, which acts in the positive and negative x-direction, is approximately constant and is independent of position and time. The x-components of the force of tension cancel, so the net force is equal to the sum of the y-components of the force as presented in FIG. 4, which is a schematic diagram showing static equilibrium of a cable mass under tension according to aspects of the present disclosure. With continued reference to that figure we note:

$$\tan\theta_1 = \frac{-F_1}{F_T} \quad \tan\theta_2 = \frac{F_2}{F_T}$$

Wherein $\tan\theta$ is equal to the slope of a function at a point, which is equal to the partial derivative of y with respect to x at that point $$\frac{F_1}{F_T} = -\left(\frac{\partial y}{\partial x}\right)_{x_1} \quad \frac{F_2}{F_T} = \left(\frac{\partial y}{\partial x}\right)_{x_2}.$$

The net force on the small mass element can be written as $$F_{net} = F_1 + F_2 = F_T\left[\left(\frac{\partial y}{\partial x}\right)_{x_2} - \left(\frac{\partial y}{\partial x}\right)_{x_1}\right]$$

Using Newton's second law, the net force is equal to the mass times acceleration.

$$F_T\left[\left(\frac{\partial y}{\partial x}\right)_{x_2} - \left(\frac{\partial y}{\partial x}\right)_{x_1}\right] = \Delta m a = u\Delta x \frac{\partial^2 y}{\partial t^2}$$

Figure 5:
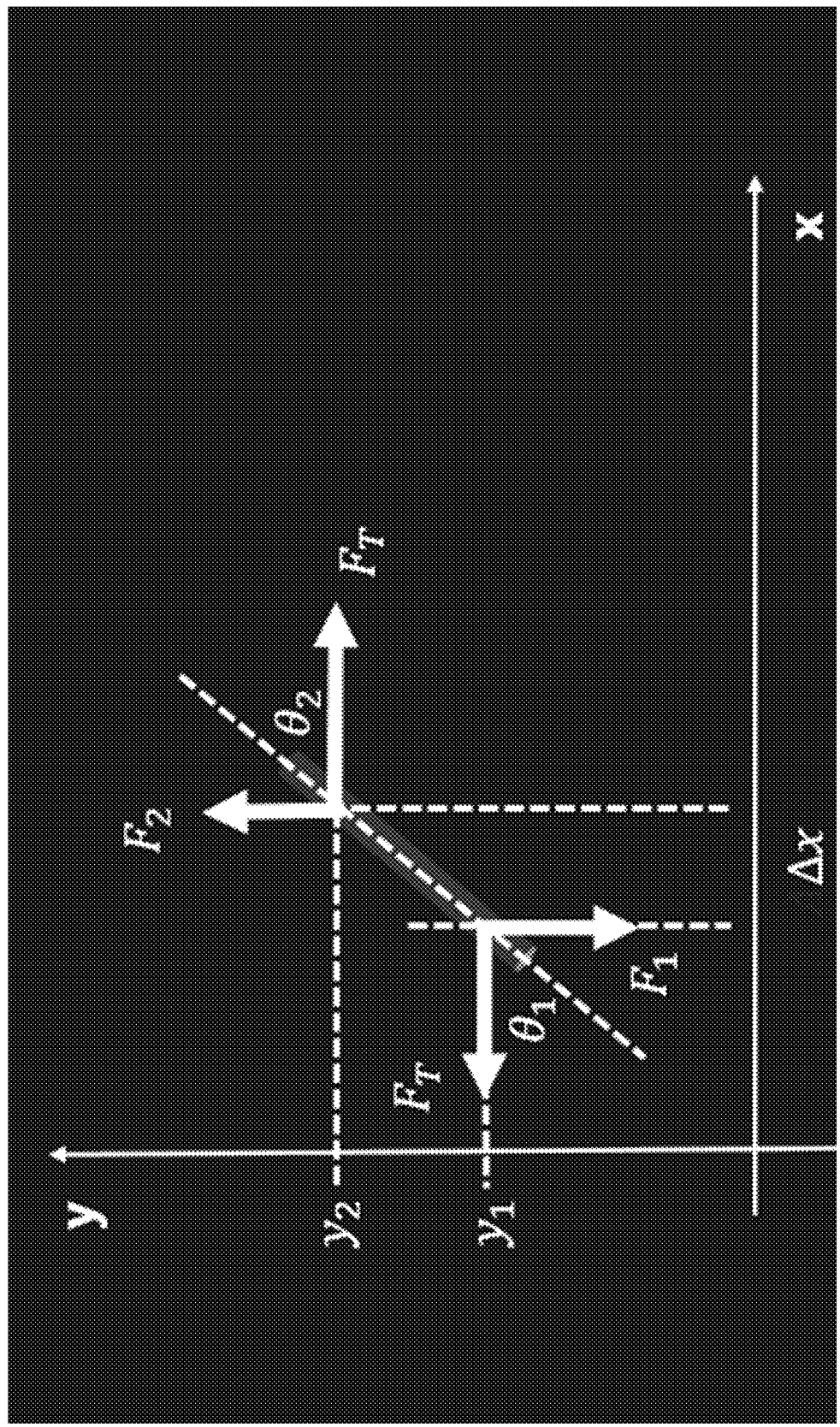
FIG. 5 is a schematic force diagram showing illustrative forces acting on a cable element according to aspects of the present disclosure.

FIG. 5 is a schematic force diagram showing illustrative forces acting on a cable element according to aspects of the present disclosure.

Dividing by $F_T \Delta x$ and taking the limit as $\Delta x$ approaches zero $$\lim_{\Delta x \to 0} \frac{\left[\left(\frac{\partial y}{\partial x}\right)_{x_2} - \left(\frac{\partial y}{\partial x}\right)_{x_1}\right]}{\Delta x} = \frac{u}{F_T}\frac{\partial^2 y}{\partial t^2}$$

$$\frac{\partial^2 y}{\partial x^2} = \frac{u}{F_T}\frac{\partial^2 y}{\partial t^2}$$

Recall that the linear wave equation is:

$$\frac{\partial^2 y(x,t)}{\partial x^2} = \frac{1}{v^2}\frac{\partial^2 y(x,t)}{\partial t^2},$$

Then we have:

$$\frac{1}{v^2} = \frac{u}{F_T}.$$

So, the tension force acting in a cable is:

$$F_T = v^2 \cdot u$$

Data Collection

Data collection: connect DAS to the target route and record hammer hit data for each pole. The recorded raw vibration data from hammer hit will be presented as waterfall images. Such waterfall images resulting from a hammer hit on a utility pole generally exhibit a "V" shape. A location in the image corresponding to the tip of the "V" is the location of that pole relative to the fiber optic sensor cable length. As those skilled in the art will understand and appreciate, this such distance determination is different from—for example—a GPS location that is not relative to a length of the fiber optic sensor cable.

Apply Edge Detection Algorithm for Pole Localization

Canny edge detection is performed to sketch edges of the waterfall image. The Canny edge detection algorithm includes the following operational processes.

1) Greyscale conversion: Convert the color image to grayscale.

2) Noise reduction: reduce noise by applying Gaussian blur with image convolution technique to smooth the grayscale image. The kernel size is determined by the expected blurring effect. The following equation presents the Gaussian filter kernel of size $(2k+1)\times(2k+1)$:

$$H_{ij} = \frac{1}{2\pi\sigma^2}\exp\left(-\frac{(i-(k+1))^2 + (j-(k+1))^2}{2\sigma^2}\right); 1 \le i, j \le (2k+1)$$

3) Gradient calculation: In the grayscale image, the edges correspond to a change of pixels' intensity. By calculating the gradient of the image using edge detection operators, the edge intensity and direction can be detected.

4) Non-maximum suppression: the non-maximum suppression is applied to the gradient intensity matrix and finds the pixels with the maximum value in the edge.

5) Double threshold: the double threshold identifies three kinds of pixels, including strong pixels that have a high intensity contributed to the final edge; the weak pixels and the other pixels.

6) Edge tracking by hysteresis: Based on the threshold results, the hysteresis can transform weak pixels into strong ones if at least one of the pixels around the one being processed is a strong one.

Wave Speed and Tension Force Calculation

Once the edges of the "V" shape is determined, we can calculate the wave speed. From the process waterfall image, we have:

$$\cot\theta = \frac{s}{t} = v$$

Figure 6:
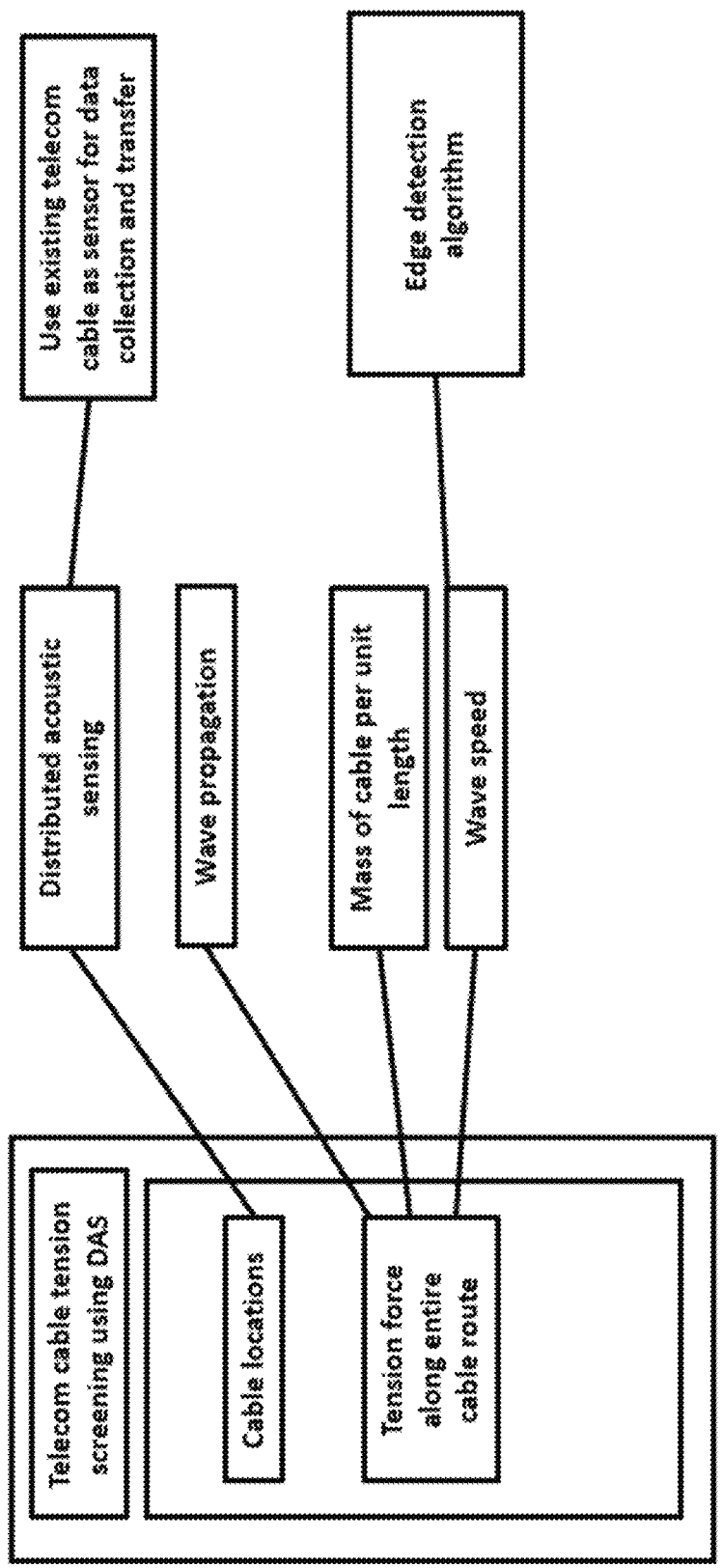
FIG. 6 is a schematic diagram showing illustrative features of systems and methods according to aspects of the present disclosure.

FIG. 6 is a schematic diagram showing illustrative features of systems and methods according to aspects of the present disclosure.

At this point, while we have presented this disclosure using some specific examples, those skilled in the art will recognize that our teachings are not so limited. Accordingly, this disclosure should be only limited by the scope of the claims attached hereto.

The invention claimed is:

1. A telecommunications cable tension screening method using wave propagation and distributed fiber optic sensing/distributed acoustic sensing (DFOS/DAS), the method comprising:

providing a distributed fiber optic sensing/distributed acoustic sensing (DFOS/DAS) system including
- a length of optical sensor fiber, at least a portion of which is suspended from a plurality of utility poles;
- an optical interrogator in optical communication with the length of optical sensor fiber, the optical interrogator configured to generate optical pulses, introduce the generated optical pulses into the length of optical sensor fiber and receive backscattered signals from the optical sensor fiber;
- an analyzer configured to collect and analyze the backscattered signals, generate waterfall images to determine utility pole localization, and determine vibration wave speed of vibrations propagating in the optical sensor fiber and determine a tension force of the optical sensor fiber;

operating the DFOS/DAS while providing mechanical impacts to a plurality of the utility poles;

generating color waterfall images from backscattered signals resulting from the mechanical impacts;

determining a location along the length of the optical sensor fiber at which a utility pole receiving mechanical impacts is located;

determining a wave speed of vibrations propagating in the optical sensor fiber resulting from the mechanical impacts; and determining a tension force of the optical sensor fiber.

2. The method of claim 1 further comprising applying a Canny edge detection operation to the color waterfall images generated from backscattered signals resulting from the mechanical impacts.

3. The method of claim 2 further comprising converting the color waterfall images to greyscale images.

4. The method of claim 3 further comprising applying a Gaussian blur with image convolution to smooth the greyscale images.

5. The method of claim 4 further comprising determining the wave speed of the vibrations propagating in the optical sensor fiber from the smoothed greyscale images and determining the tension force in the optical sensor fiber from the determined wave speed.

* * * * *